United States Patent
Xu et al.

(10) Patent No.: US 11,660,743 B2
(45) Date of Patent: May 30, 2023

(54) BALL SCREW SPLINE ASSEMBLY AND RELATED METHOD

(71) Applicant: ABB Schweiz AG, Baden (CH)

(72) Inventors: Xiao Xu, Shanghai (CN); Tao Feng, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 226 days.

(21) Appl. No.: 16/886,014

(22) Filed: May 28, 2020

(65) Prior Publication Data

US 2020/0292037 A1    Sep. 17, 2020

Related U.S. Application Data

(63) Continuation of application No. PCT/CN2017/114857, filed on Dec. 6, 2017.

(51) Int. Cl.
  *B25J 9/04*   (2006.01)
  *B25J 9/10*   (2006.01)
  *F16H 25/20*  (2006.01)

(52) U.S. Cl.
  CPC .............. *B25J 9/044* (2013.01); *B25J 9/102* (2013.01); *F16H 2025/2096* (2013.01)

(58) Field of Classification Search
  CPC ..... B25J 9/044; B25J 9/12; B25J 9/102; B25J 9/10; F16H 25/2204; F16H 25/2209; F16H 2025/2081; F16H 2025/2096
  See application file for complete search history.

(56) References Cited

U.S. PATENT DOCUMENTS

| | | | |
|---|---|---|---|
| 4,939,946 A | * | 7/1990 | Teramachi ............ F16D 3/065 74/89.3 |
| 5,121,647 A | | 6/1992 | Teramachi |
| | | | (Continued) |

FOREIGN PATENT DOCUMENTS

| | | |
|---|---|---|
| CN | 201970315 U | 9/2011 |
| CN | 202862226 U | 4/2013 |
| | (Continued) | |

OTHER PUBLICATIONS

CN 206326592 U (Zhou-yi Zhang) Jul. 14, 2017 (full text), [online] [retrieved on Apr. 26, 2022], Retrieved from ProQuest Dialog. (Year: 2017).*

(Continued)

*Primary Examiner* — Joseph Brown
(74) *Attorney, Agent, or Firm* — Greenberg Traurig, LLP

(57) ABSTRACT

A ball screw spline assembly includes a ball screw spline including a first nut including a first mounting surface adapted to receive a first fastening element; a second nut including a second mounting surface adapted to receive a second fastening element; and a shaft passing through the first nut and the second nut; the housing including a first portion and a second portion, the first portion extends in a direction substantially parallel to the shaft, and the second portion extends in a direction substantially perpendicular to the shaft; a connecting plate coupling the second nut to the first portion, the first nut is installed to the second portion; the first mounting surface and the second mounting surface are located within a space defined by the first portion, the second portion and the connecting plate, such that the ball screw spline is integrally installable to the housing.

18 Claims, 3 Drawing Sheets

(56) References Cited

U.S. PATENT DOCUMENTS

| | | | |
|---|---|---|---|
| 10,913,147 B2 * | 2/2021 | Adachi | B25J 9/0018 |
| 2018/0229378 A1 * | 8/2018 | Adachi | B25J 9/0018 |
| 2020/0338762 A1 * | 10/2020 | Watanabe | B25J 9/101 |
| 2021/0069895 A1 * | 3/2021 | Watanabe | B25J 19/0025 |

FOREIGN PATENT DOCUMENTS

| | | |
|---|---|---|
| CN | 105345807 A | 2/2016 |
| CN | 106272365 A | 1/2017 |
| CN | 106863272 A | 6/2017 |
| CN | 206326592 U | 7/2017 |
| CN | 206455659 U | 9/2017 |
| EP | 3208050 A1 | 8/2017 |
| JP | 6215000 B2 | 10/2017 |

OTHER PUBLICATIONS

State Intellectual Property Office of the P.R. China, International Search Report & Written Opinion issued in corresponding Application No. PCT/CN2017/114857, dated Aug. 29, 2018, 10 pp.

Extended European Search Report, issued by the European Patent Office, regarding corresponding patent application Serial No. 17934250.6; dated Jul. 9, 2021; 10 pages.

* cited by examiner

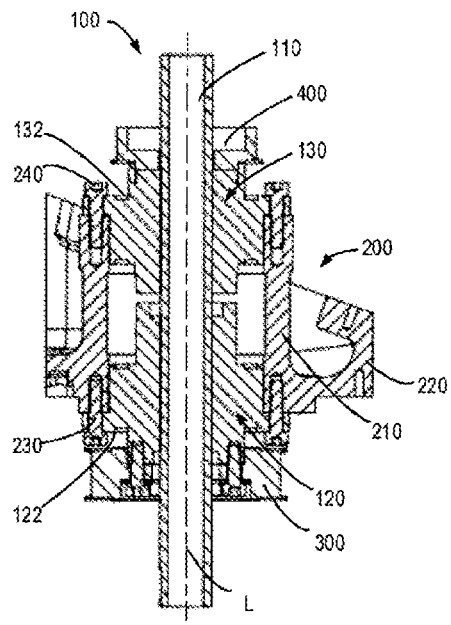
PRIOR ART – Fig. 1
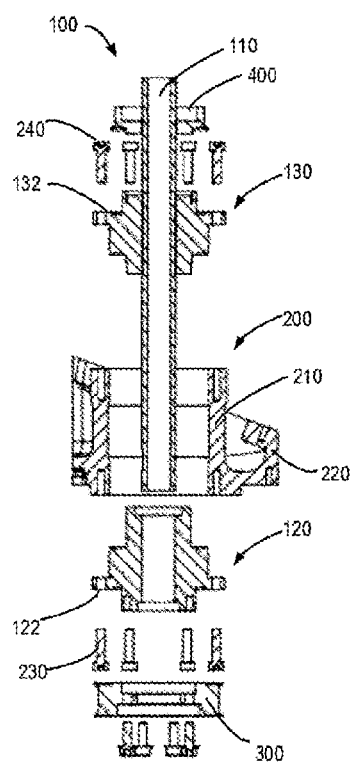
PRIOR ART – Fig. 2

BALL SCREW SPLINE ASSEMBLY AND RELATED METHOD

FIELD

Embodiments of present disclosure generally relate to a method for installing a ball screw spline, and further, to a resulting ball screw spline assembly for a robot arm.

BACKGROUND

Nowadays robots of selective compliance assembly robot arm (SCARA) have become more and more popular. A SCARA robot generally includes a ball screw or ball screw spline for performing a movement along and around Z-axis.

For current ball screw spline installation and maintenance in most SCARA robots, the ball screw spline itself has to be disassembled first. For example, a spline nut of the ball screw spline has to be removed from a shaft in order to mount the ball screw spline to a housing. It is inconvenient to disassemble the spline nut from the shaft when installing or maintaining the ball screw spline in the SCARA robots. This also hampers an automatic assembly of a ball screw spline to a housing, and it is hard to achieve an automatic production of a robot arm.

Furthermore, a pulley installed on the spline nut has risks to interfere with bolts mounted on a flange of the spline nut. Generally, the pulley is separated from the bolts for the spline nut by a distance, so as to avoid interaction between the pulley and bolts. This leads to an increased size of a ball screw spline based assembly. Otherwise, the pulley on the spline nut must be customized to prevent interference with the bolts mounted on the flange of the spline nut.

SUMMARY

Embodiments of the present disclosure provide a method for installing a ball screw spline and a resulting ball screw spline assembly, and further provide a robot arm and robot comprising such a ball screw spline assembly.

In a first aspect, a ball screw spline assembly is provided. The ball screw spline assembly comprises a ball screw spline, a housing and a connecting plate. The ball screw spline includes: a first nut including a first mounting surface adapted to receive a first fastening element for installing the first nut to a housing; a second nut including a second mounting surface adapted to receive a second fastening element for installing the second nut to the housing; and a shaft passing through the first nut and the second nut. The housing includes a first portion and a second portion. The first portion extends in a direction substantially parallel to the shaft, and the second portion extends in a direction substantially perpendicular to the shaft. The connecting plate couples the second nut to the first portion of the housing, and the first nut is installed to the second portion of the housing. The first mounting surface and the second mounting surface are located within a space defined by the first portion, the second portion of the housing and the connecting plate, such that the ball screw spline is integrally installable to the housing.

In some embodiments, the first nut includes a first end adjacent to the second nut and a second end opposite to the first end; and the first mounting surface is provided at or adjacent to the first end.

In some embodiments, the first mounting surface is provided such that the first fastening element is received within the housing without protruding from the second portion of the housing.

In some embodiments, the first nut is partially located in a first opening of the second portion of the housing, and the second nut is partially located in a second opening of the connecting plate.

In some embodiments, the first nut are adapted to receive a first pulley at the second end of the first nut, and the second nut are adapted to receive a second pulley at an end of the second nut remote from the first nut.

In some embodiments, the first mounting surface is provided on a first flange portion of the first nut; and/or the second mounting surface is provided on a second flange portion of the second nut.

In some embodiments, the first nut is one of a ball screw nut and a spline nut, and the second nut is the other one of the ball screw nut and the spline nut.

In a second aspect, there is provided a method for installing a ball screw spline to a housing. The ball screw spline includes a shaft, a first nut and a second nut, wherein the shaft passes through the first nut and the second nut. The housing includes a first portion and a second portion, wherein the first portion extends in a direction substantially parallel to the shaft, and the second portion extends in a direction substantially perpendicular to the shaft. The method comprises: installing the first nut to the second portion of the housing with a first fastening element, the first fastening element being received by a first mounting surface of the first nut; installing the second nut to a connecting plate with a second fastening element, the second fastening element being received by a second mounting surface of the second nut; and installing the connecting plate to the first portion of the housing; wherein the first mounting surface and the second mounting surface are located within a space defined by the first portion, the second portion of the housing and the connecting plate in the case that the ball screw spline is installed to the housing, such that in the ball screw spline is integrally installable to the housing.

In some embodiments, the first nut includes a first end adjacent to the second nut and a second end opposite to the first end; and the first mounting surface is provided at or adjacent to the first end.

In some embodiments, the first mounting surface is provided such that the first fastening element is received within the housing without protruding from the second portion of the housing in the case that the first nut is installed to the housing.

In some embodiments, the first nut is partially located in a first opening of the second portion of the housing, and the second nut is partially located in a second opening of the connecting plate.

In some embodiments, the method further comprises installing a first pulley to the first nut at the second end of the first nut; and installing a second pulley to the second nut at an end of the second nut remote from the first nut.

In some embodiments, the first mounting surface is provided on a first flange portion of the first nut; and/or the second mounting surface is provided on a second flange portion of the second nut.

In some embodiments, the first nut is one of a ball screw nut and a spline nut, and the second nut is the other one of the ball screw nut and the spline nut.

In a third aspect, a robot arm is provided. The robot arm comprises the ball screw spline assembly according to the first aspect.

In a fourth aspect, a robot is provided. The robot comprises the robot arm according to the third aspect.

In some embodiments, the robot is of a type of selective compliance assembly robot arm (SCARA).

The ball screw spline of the present disclosure is integrally installable to the housing, and thus there is no need to remove the spline nut from the shaft when installing and maintaining the ball screw spline. With the bolts adapted to be received within the housing without protruding from the housing, the robot arm comprising the ball screw spline assembly of the present disclosure can be compact since the pulley no longer interferes with the bolts mounted on the spline nut.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

DESCRIPTION OF DRAWINGS

Drawings described herein are provided to further explain the present disclosure and constitute a part of the present disclosure. The example embodiments of the disclosure and the explanation thereof are used to explain the present disclosure, rather than to limit the present disclosure improperly.

FIG. 1 illustrates an assembly view of a ball screw spline installed to a housing in the prior art;

FIG. 2 illustrates an exploded view of the assembly view shown in FIG. 1;

Throughout the drawings, the same or similar reference numerals represent the same or similar element.

DETAILED DESCRIPTION OF EMBODIMENTS

Figure 3:
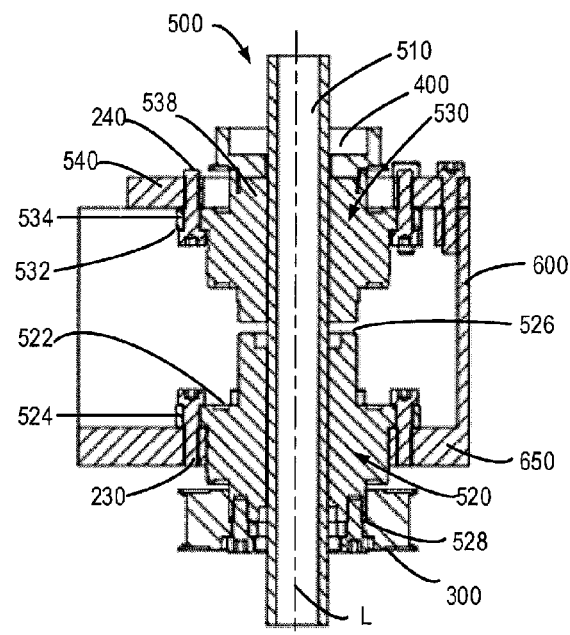
FIG. 3 illustrates an assembly view of a ball screw spline installed to a housing according to embodiments of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

A robot of a selective compliance assembly robot arm (SCARA) type or a horizontal multi-joint type has become more and more popular. A SCARA robot generally includes a ball screw spline for performing a movement along and around Z-axis. In particular, it is an arm of a SCARA robot that includes a ball screw spline.

FIG. 1 illustrates an assembly view of a ball screw spline 100 installed to a housing 200 in the prior art, and FIG. 2 illustrates an exploded view of the assembly view shown in FIG. 1. The assembly of a ball screw spline 100 installed to a housing 200 may be used to constitute an arm of a SCARA robot, for example.

As shown in the assembly view of FIG. 1, a ball screw spline 100 includes a shaft 110, a ball screw nut 130 and a spline nut 120. The surface of the shaft 110 may have a spiral groove and an axial groove extending along an axis L of the shaft 110 (also referred to as Z-axis). A first pulley 300 is adapted to be mounted to the spline nut 120, so as to cause the shaft 110 to perform a spiral movement; and a second pulley 400 is adapted to be mounted to the ball screw nut 130, so as to cause the shaft 110 to perform an axially rectilinear translation.

The existed housing 200 is adapted to receive the ball screw spline 100 and includes an internal wall 210 and an external wall 220. In the assembly state as shown in FIG. 1, the spline nut 120 is mounted to the internal wall 210 of the housing 200 by bolts 230 through a first flange surface 122 of the spline nut 120. The ball screw nut 130 is also mounted to the internal wall 210 by bolts 240 through a second flange surface 132 of the ball screw nut 130. In the case that the ball screw spline 100 is installed to the housing 200 in the prior art, the internal wall 210 of the housing 200 is located between the first flange surface 122 and the second flange surface 132.

The ball screw spline 100 is provided in the market as an assembly of a shaft 110, a ball screw nut 130 and a spline nut 120. As shown in FIG. 1, the shaft 110 passes through the ball screw nut 130 and the spline nut 120. For current ball screw spline installation and maintenance in most SCARA robots, the ball screw spline 100 itself has to be disassembled first. Since the detaching of the ball screw nut 130 will cause a failure of the ball screw spline 100, the spline nut 120 usually has to be removed from the shaft 110 in order to mount the ball screw spline 100 to a housing 200.

As shown in FIG. 2, the spline nut 120 and its first pulley 300 have been removed from the shaft 110 to facilitate the installation of the ball screw nut 130 and the spline nut 120 to the housing 200.

It is inconvenient to disassemble the spline nut 120 from the shaft 110 when installing or maintaining the ball screw spline 100 in SCARA robots. Moreover, for example, the first pulley 300 installed on the spline nut 120 has risks to interfere with bolts 230 mounted on the first flange surface 122 of the spline nut 120. This is caused by the protruding of bolts 230 (e.g., heads of bolts 230 in FIG. 1) from the first flange surface 122 of the spline nut 120. As a result, the first pulley 300 on the spline nut 120 must be customized to prevent interference with the bolts 230 mounted on a flange of the spline nut 120.

Figure 4:
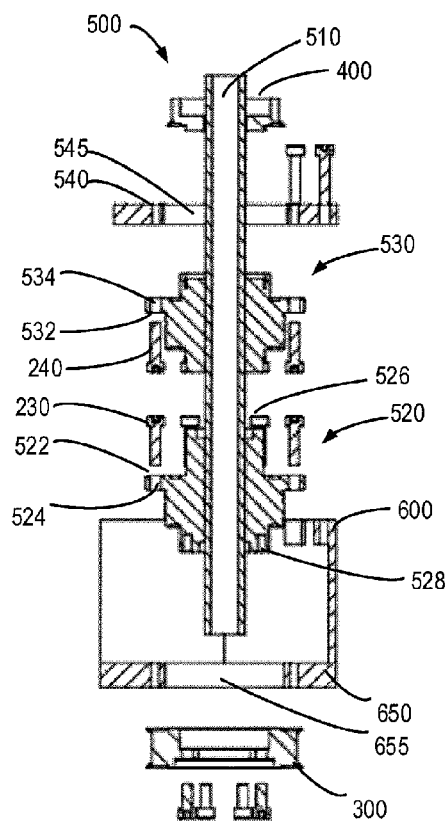
FIG. 4 illustrates an exploded view of the assembly view shown in FIG. 3.

FIG. 3 illustrates an assembly view of a ball screw spline 500 installed to a housing according to embodiments of the present disclosure, and FIG. 4 illustrates an exploded view of the assembly view shown in FIG. 3. In some embodiments, the assembly of the ball screw spline 500 installed to the housing may be used to constitute an arm of a SCARA robot.

As shown, according to embodiments of the present disclosure, a ball screw spline assembly includes a ball screw spline 500, a housing and connecting plate 540. The ball screw spline 500 includes a first nut 520, a second nut 530, and a shaft 510. The shaft 510 passes through the first nut 520 and the second nut 530. In some embodiments, the first nut 520 may be one of a ball screw nut and a spline nut, while the second nut 530 may be the other one of the ball screw nut and the spline nut. For example, in some embodiments, the first nut 520 is a spline nut and the second nut 530 is a ball screw nut. Alternatively, in other embodiments, the first nut 520 and the second nut 530 may be exchangeable and identical. Of course, the first and/or second nuts may be implemented by any other suitable mechanism as well.

In some embodiments, the surface of the shaft 510 may have a spiral groove and an axial groove extending along an axis L of shaft 510. A first pulley 300 is adapted to be mounted to an end 528 of the spline nut remote from the ball screw nut, so as to cause the shaft 510 to perform a spiral movement. Additionally, a second pulley 400 is adapted to be mounted to an end 538 of the ball screw nut remote from the spline nut, so as to cause the shaft 510 to perform an axially rectilinear translation. Advantageously, the first pulley 300 and the second pulley 400 are adapted not to be provided between the spline nut and the ball screw nut, thereby facilitating the integral and automatic installation of the ball screw spline 500.

The first nut 520 includes a first mounting surface 522 adapted to receive a first fastening element 230 for installing the first nut 520 to a housing. The second nut 530 includes a second mounting surface 532 adapted to receive a second fastening element 240 for installing the second nut 530 to the housing. The housing includes a first portion 600 and a second portion 650. The first portion 600 extends in a direction substantially parallel to the shaft 510. The second portion 650 extends in a direction substantially perpendicular to the shaft 510. The first nut 520 is installed to the second portion 650 of the housing. For example, the first mounting surface 522 of the first nut 520 is above the second portion 650 of the housing as shown in FIG. 3. The connecting plate 540 may couple the second nut 530 to the first portion 600 of the housing.

The first mounting surface 522 and the second mounting surface 532 are located within a space defined by the first portion 600, the second portion 650 of the housing and the connecting plate 540, such that the ball screw spline 500 is integrally installable to the housing. Alternatively, in some embodiments, the ball screw spline 500 is replaceable and integrally detachable from the housing. In some embodiments, the first mounting surface 522 and the second mounting surface 532 face to each other, and both are adapted to be received between the connecting plate 540 and the second portion 650 of the housing. In this way, by changing the orientation of a mounting surface relative to an associated housing portion (i.e., changing from the first flange surface 122 and the second flange surface 132 in FIG. 1 to the first mounting surface 522 and/or the second mounting surface 532 in FIG. 3), the ball screw spline 500 can be easily installed to the housing without the first nut 520 or the second nut 530 being removed from the shaft 510. In other words, the first nut 520 and the second nut 530 now can be mounted to the housing along the same direction. This enables an automatic assembly of the ball screw spline 500 to the housing, and thus an automatic production of a robot arm.

As an example and without limitation, the first fastening element 230 and the second fastening element 240 are bolts, such that it is easy to install and detach the ball screw spline 500 to and from the housing. Alternatively, the first and/or second fastening elements may be viscous elements. Of course, the first and/or second fastening elements may be implemented by any other suitable securing mechanism as well. In some embodiments, the first mounting surface 522 is provided on a first flange portion 524 of the first nut 520, thereby facilitating receiving the first fastening element 230. Alternatively, or in addition, the second mounting surface 532 is provided on a second flange portion 534 of the second nut 530, thereby facilitating receiving the second fastening element 240. Alternatively, the first and/or second mounting surfaces may be any surfaces for fixing the first and/or second nuts.

In some embodiments, the first nut 520 includes a first end 526 adjacent to the second nut 530 and a second end 528 opposite to the first end 526. The first mounting surface 522 is provided at or adjacent to the first end 526. In this way, the first fastening element 230 such as a bolt will be located adjacent to the first end 526 after being received on the first mounting surface 522. In other words, the first fastening element 230 will be received within the housing as much as possible. This makes room for mounting a first pulley 300 at the second end 528. Thereby, the length of the assembly of the ball screw spline 500 and the housing in the axis L can be reduced.

In some embodiments, the first mounting surface 522 is provided in such a way that in the case that the first nut 520 is installed to the housing, the first fastening element 230 is adapted to be received within the housing without protruding from the housing. For example, the threaded portion of a bolt provided as the first fastening element 230 may not protrude from the second portion 650 of the housing. In this way, the first pulley 300 no longer interferes with the bolts mounted on the first nut 520 such as a spline nut. As a result, the assembly of the ball screw spline 500 and the housing may be made compact. Moreover, the first pulley 300 can be located close to the first nut 520, which can reduce the bending moment on the bearings of the ball screw spline 500 and increase the lifetime in of the ball screw spline 500. Of course, it is possible that the first fastening element 230 protrudes from the second portion 650 of the housing. In some embodiments, the protruded portion of the first fastening element 230 is shorter than the case shown in FIG. 1.

As an example, the connecting plate 540 may include a flange (not shown). The width of the flange in a radial direction lateral to the axis L is larger than that of the second nut 530, thereby facilitating the integral installation of the ball screw spline 500. In some embodiments, the first nut 520 is partially located in a first opening 655 of the second portion 650 of the housing. The second nut 530 is partially located in a second opening 545 of the connecting plate 540. The shaft 500 may also pass through the connecting plate 540 and the second portion 650 of the housing.

In some embodiments, the first portion 600 of the housing has a cylindrical shape. The cylindrical space defined by the first portion 600, the second portion 650 of the housing and the connecting plate 540 is adapted to partially accommodate the ball screw spline 500. Compared with the existed housing 200 as shown in FIG. 1, the housing of FIG. 3 includes no portion between the first mounting surface 522 and the second mounting surface 532 along the shaft.

Figure 5:
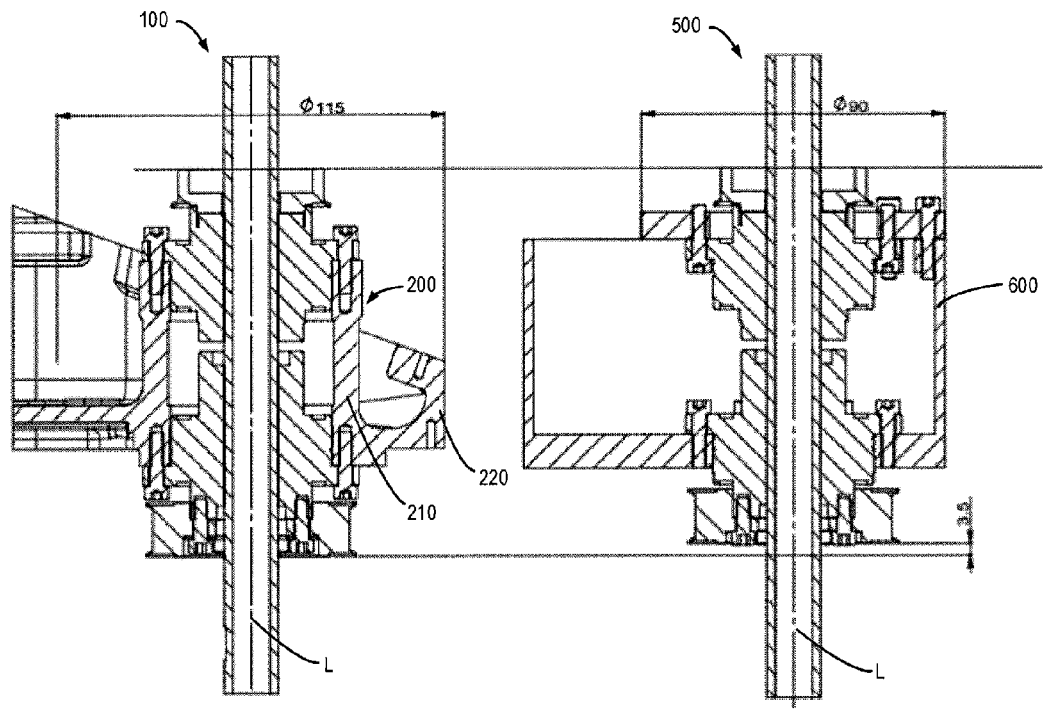
FIG. 5 is a diagram illustrating the size of a robot arm according to embodiments of the present disclosure compared with the size of the traditional robot arm.

FIG. 5 is a diagram illustrating the size of a robot arm according to embodiments of the present disclosure compared with the size of the traditional robot arm. The robot arm according to embodiments of the present disclosure (shown on the right hand) includes the ball screw spline 500 and the housing, and the conventional robot arm (shown on the left hand) includes the ball screw spline 100 and the housing 200.

In the traditional robot arm, there is a large gap between the internal wall 210 and the external wall 220 of the housing 200 due to a casting process of the housing 200. On the contrary, in the improved assembly for ball screw spline 500, there is no housing wall such as the internal wall 210 between the first nut 520 and the second nut 530. As a result, the diameter of the housing can be reduced. In this example, as shown in FIG. 5, the diameter of the proposed housing is 90 mm smaller than that of the existed housing 200 of 115 mm. It is to be understood that the specific numeral values are given only for illustration, without suggesting any limitations as to the scope of the present disclosure.

In addition, as discussed above, due to the changed orientation of the first mounting surface 522 relative to an associated housing portion, the first pulley 300 installed on the first nut 520 has no risks to interfere with bolts mounted on the first mounting surface 522. Thus, as shown in FIG. 5, the length of the assembly of the ball screw spline 500 and the housing in the axis L can be reduced by 3.5 mm compared with the traditional robot arm. As a result, the robot arm according to embodiments of the present disclosure may be compact. It is to be understood that the specific numeral values are given only for illustration, without suggesting any limitations as to the scope of the present disclosure.

Figure 6:
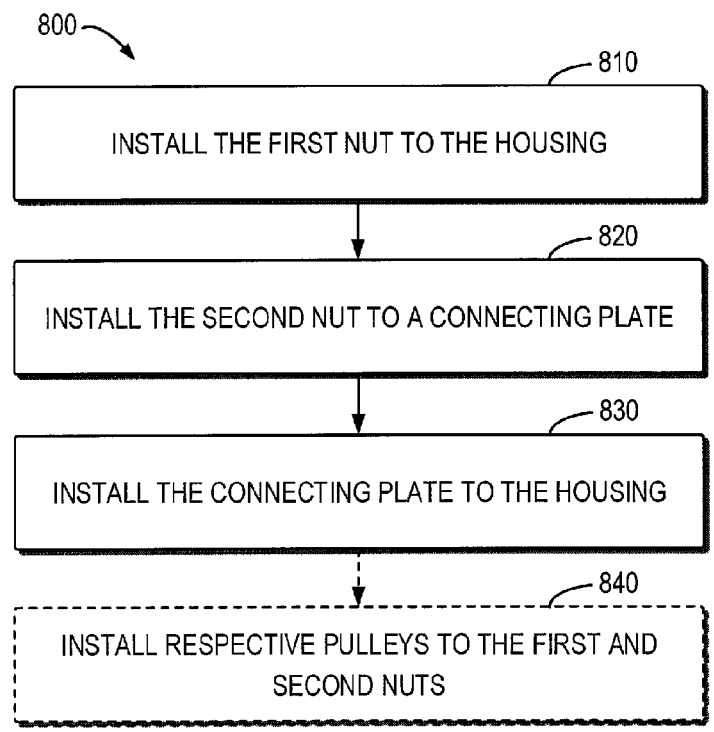
FIG. 6 is a flowchart illustrating a method for installing a ball screw spline to a housing according to embodiments of the present disclosure.

FIG. 6 is a flowchart illustrating a method 800 for installing a ball screw spline 500 to a housing according to embodiments of the present disclosure. In some embodiments, the method 800 may be at least in part automatically performed, for example, by a manipulator or a robot arm. The method 800 may be described in conjunction with FIG. 4. As discussed above, the ball screw spline 500 includes a first nut 520, a second nut 530 and a shaft 510 passing through the first nut 520 and the second nut 530. The housing including a first portion 600 and a second portion 650. The first portion 600 extends in a direction substantially parallel to the shaft 510. The second portion 650 extends in a direction substantially perpendicular to the shaft 510.

In block 810, for installing the ball screw spline 500, the first nut 520 is first installed to the second portion 650 of the housing with a first fastening element 230, and the first fastening element 230 is received by a first mounting surface 522 of the first nut 520. For example, the first mounting surface 522 of the first nut 520 is above the second portion 650 of the housing as shown in FIG. 3.

In block 820, the second nut 530 is installed to a connecting plate 540 with a second fastening element 240. The second fastening element 240 is received by a second mounting surface 532 of the second nut 530. The second mounting surface 532 of the second nut 530 may be located under the connecting plate 540.

In block 830, the connecting plate 540 is installed to the first portion 600 of the housing, such that the connecting plate 540 may be located on the top of the first portion 600. The first mounting surface 522 and the second mounting surface 532 are located within a space defined by the first portion 600, the second portion 650 of the housing and the connecting plate 540 in the case that the ball screw spline 500 is installed to the housing, such that the ball screw spline 500 is integrally installable to the housing.

In some embodiments, the first nut 520 includes a first end 526 adjacent to the second nut 530 and a second end 528 opposite to the first end 526. The first mounting surface 522 is provided at or adjacent to the first end 526.

In some embodiments, the first mounting surface 522 is provided such that the first fastening element 230 is received within the housing without protruding from the second portion 650 of the housing in the case that the first nut 520 is installed to the housing.

In some embodiments, the first nut 520 is partially located in a first opening 655 of the second portion 650 of the housing, and the second nut 530 is partially located in a second opening 545 of the connecting plate 540, in the case that the ball screw spline 500 is installed to the housing.

In an optional block 840, finally, a first pulley 300 is installed to the first nut 520 at the second end 528 of the first nut 520, and a second pulley 400 is installed to the second nut 530 at an end 538 of the second nut 530 remote from the first nut 520.

In some embodiments, the first mounting surface 522 is provided on a first flange portion 524 of the first nut 520. Alternatively, or in addition, the second mounting surface 532 is provided on a second flange portion 534 of the second nut 530.

In some embodiments, the first nut 520 is one of a ball screw nut and a spline nut, and the second nut 530 is the other one of the ball screw nut and the spline nut.

It is understood that although the method 800 is described as a sequential process, some of the actions may be performed in parallel or concurrently. In addition, the order of the actions may be re-arranged, and additional actions not shown in the flowchart may also be included.

When installing and maintaining the ball screw spline 500 according to embodiments of the present disclosure, there is no need to remove a nut such as the spline nut from the shaft 510. The assembly of the ball screw spline 500 and the housing may be compact since the first pulley 300 no longer interferes with the bolts mounted on the first nut 520 such as a spline nut. The first pulley 300 can be close to the first nut 520, which can reduce the bending moment on the bearings of the ball screw spline 500 and increase the lifetime of the ball screw spline 500.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

What is claimed is:

1. A A ball screw spline assembly, comprising:
  a housing including:
    a first portion; and
    a second portion;
  a ball screw spline including:
    a first nut including a first mounting surface adapted to receive a first fastening element for installing the first nut to the housing;
    a second nut including a second mounting surface adapted to receive a second fastening element for installing the second nut to the housing; and
    a shaft passing through the first nut and the second nut; and
  a connecting plate coupling the second nut to the first portion, wherein the first nut is installed to the second portion;

wherein the first portion extends in a direction substantially parallel to the shaft, and wherein the second portion extends in a direction substantially perpendicular to the shaft;

wherein the first mounting surface and the second mounting surface are located within a cylindrical space defined by the first portion, the second portion and the connecting plate, such that the ball screw spline is integrally installable to the housing;

wherein the first nut includes a first end adjacent to the second nut and a second end opposite to the first end;

wherein the first end is disposed a first distance from the second nut;

wherein the second end is disposed a second distance from the second nut; and wherein the first distance between the first end of the first nut and the second nut is smaller than the second distance between the second end of the first nut and the second nut; and wherein the first nut is adapted to receive a first pulley at the second end of the first nut, and the second nut is adapted to receive a second pulley at an end of the second nut remote from the first nut.

2. The ball screw spline assembly of claim 1,
wherein the first mounting surface is provided at or adjacent to the first end.

3. The ball screw spline assembly of claim 2, wherein the first mounting surface is provided such that the first fastening element is received within the housing without protruding from the second portion.

4. The ball screw spline assembly of claim 3, wherein the first nut is partially located in a first opening of the second portion, and the second nut is partially located in a second opening of the connecting plate.

5. The ball screw spline assembly of claim 1, wherein the first mounting surface is provided on a first flange portion of the first nut; or
wherein the second mounting surface is provided on a second flange portion of the second nut.

6. The ball screw spline assembly of claim 5, wherein the first nut is one of a ball screw nut and a spline nut, and the second nut is another one of the ball screw nut and the spline nut.

7. A robot arm, comprising the ball screw spline assembly of claim 1.

8. A robot, comprising the robot arm of claim 7.

9. The robot of claim 8, wherein the robot is of a type of selective compliance assembly robot arm (SCARA).

10. The ball screw spline assembly of claim 1, wherein the first nut is partially located in a first opening of the second portion, and the second nut is partially located in a second opening of the connecting plate.

11. The ball screw spline assembly of claim 1, wherein the first mounting surface is provided on a first flange portion of the first nut; and wherein the second mounting surface is provided on a second flange portion of the second nut.

12. A method for installing a ball screw spline to a housing, the ball screw spline including a shaft, a first nut and a second nut, the shaft passing through the first nut and the second nut, the housing including a first portion and a second portion, the first portion extending in a direction substantially parallel to the shaft, the second portion extending in a direction substantially perpendicular to the shaft, the method comprising:

installing the first nut to the second portion with a first fastening element, the first fastening element being received by a first mounting surface of the first nut;

installing the second nut to a connecting plate with a second fastening element, the second fastening element being received by a second mounting surface of the second nut;

installing the connecting plate to the first portion;

installing a first pulley to the first nut at a second end of the first nut; and installing a second pulley to the second nut at an end of the second nut remotefrom the first nut;

wherein the first mounting surface and the second mounting surface are located within a space defined by the first portion, the second portion and the connecting plate in the case that the ball screw spline is installed to the housing, such that the ball screw spline is integrally installable to the housing;

wherein the first nut includes a first end adjacent to the second nut and the second end opposite to the first end;

wherein the first end is disposed a first distance from the second nut;

wherein the second end is disposed a second distance from the second nut;

wherein the first distance between the first end of the first nut and the second nut is smaller than the second distance between the second end of the first nut and the second nut.

13. The method of claim 12,
wherein the first mounting surface is provided at or adjacent to the first end.

14. The method of claim 13, wherein the first mounting surface is provided such that the first fastening element is received within the housing without protruding from the second portion in the case that the first nut is installed to the housing.

15. The method of claim 14, wherein the first nut is partially located in a first opening of the second portion, and the second nut is partially located in a second opening of the connecting plate.

16. The method of claim 12, wherein the first mounting surface is provided on a first flange portion of the first nut; and/or
wherein the second mounting surface is provided on a second flange portion of the second nut.

17. The method of claim 12, wherein the first nut is one of a ball screw nut and a spline nut, and the second nut is another one of the ball screw nut and the spline nut.

18. The method of claim 12, wherein the first nut is partially located in a first opening of the second portion, and the second nut is partially located in a second opening of the connecting plate.

* * * * *